United States Patent
Kuo et al.

(10) Patent No.: US 11,777,542 B2
(45) Date of Patent: Oct. 3, 2023

(54) METHOD FOR TUNING ENVELOPE TRACKING SYSTEM AND ASSOCIATED PROCESSING MODULE

(71) Applicant: MEDIATEK INC., Hsin-Chu (TW)

(72) Inventors: Ting-Hsun Kuo, Hsinchu (TW); Tsung-Pin Hu, Hsinchu (TW); Wei-Che Tseng, Hsinchu (TW); Chih-Chia Wang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/529,288

(22) Filed: Nov. 18, 2021

(65) Prior Publication Data

US 2022/0158669 A1  May 19, 2022

Related U.S. Application Data

(60) Provisional application No. 63/115,102, filed on Nov. 18, 2020.

(51) Int. Cl.
H04B 1/04 (2006.01)

(52) U.S. Cl.
CPC ..... H04B 1/0475 (2013.01); *H04B 2001/045* (2013.01)

(58) Field of Classification Search
CPC ......... H04B 1/0475; H04B 2001/0408; H04B 1/40; H04B 2001/0425
USPC ................................................. 375/295–297
See application file for complete search history.

(56) References Cited

U.S. PATENT DOCUMENTS

| | | | |
|---|---|---|---|
| 7,729,255 B2 * | 6/2010 | Tanabe | H04N 5/23203 370/347 |
| 9,130,796 B2 | 9/2015 | Krishnan | |
| 9,634,695 B1 * | 4/2017 | Subrahmaniyan Radhakrishnan | H03F 3/24 |
| 9,729,255 B1 | 8/2017 | Rohdin | |
| 9,755,669 B2 | 9/2017 | Chen | |
| 2006/0046666 A1 * | 3/2006 | Hara | H03F 3/189 455/127.1 |
| 2013/0034139 A1 * | 2/2013 | Khlat | H03F 1/0227 375/224 |
| 2016/0373142 A1 * | 12/2016 | Chen | H03F 1/0216 |
| 2017/0126258 A1 * | 5/2017 | Subrahmaniyan Radhakrishnan | H04B 1/0475 |
| 2017/0353163 A1 * | 12/2017 | Gazneli | H03F 3/195 |
| 2019/0319583 A1 * | 10/2019 | El-Hassan | H03F 3/245 |
| 2020/0382147 A1 | 12/2020 | Menkhoff | |
| 2021/0126600 A1 | 4/2021 | Sukemori | |

* cited by examiner

*Primary Examiner* — Emmanuel Bayard
(74) *Attorney, Agent, or Firm* — Winston Hsu

(57) ABSTRACT

A method for tuning an envelope tracking (ET) system includes: determining a setting combination from a plurality of setting available to the ET system, wherein determining the setting combination from the plurality of setting available to the ET system includes: determining, by a processing module, a first setting in a plurality of first settings included in the plurality of settings, and configuring the ET system by the first setting; and after the ET system is configured by the first setting, determining, by the processing module, a second setting in a plurality of second settings included in the plurality of settings, and configuring the ET system by the second setting. In addition, the setting combination includes the first setting and the second setting.

11 Claims, 4 Drawing Sheets

METHOD FOR TUNING ENVELOPE TRACKING SYSTEM AND ASSOCIATED PROCESSING MODULE

CROSS REFERENCE TO RELATED APPLICATIONS

This application claims the benefit of U.S. provisional application No. 63/115,102, filed on Nov. 18, 2020 and incorporated herein by reference.

BACKGROUND

With the increasing demand for high data rate, the modulation scheme in wireless communications becomes more and more complicated, and the modulation scheme may reduce the efficiency of a radio frequency (RF) power amplifier (PA) in a chip disposed in a wireless communication device (e.g. a phone). The envelope tracking (ET) may be arranged to increase the efficiency of the RF PA. In the product line of wireless communication devices, ET tuning is needed to optimize the performance of the entire ET system. However, the ET tuning process is quite time-consuming, and a feasible ET tuning time may only be achieved at the expense of the performance of the ET system. As a result, a novel method for tuning the ET system is urgently needed, to improve the performance of the ET system under the feasible ET tuning time.

SUMMARY

It is therefore one of the objectives of the present invention to provide a method and associated processing module for tuning ET system, to address the above-mentioned issues.

According to at least one embodiment of the present invention, a method for tuning an ET system is provided. The method may include: determining a setting combination from a plurality of setting available to the ET system, wherein determining the setting combination from the plurality of setting available to the ET system comprises: determining, by a processing module, a first setting in a plurality of first settings included in the plurality of settings, and configuring the ET system by the first setting; and after the ET system is configured by the first setting, determining, by the processing module, a second setting in a plurality of second settings included in the plurality of settings, and configuring the ET system by the second setting. In addition, the setting combination may include the first setting and the second setting.

According to one embodiment of the present invention, a processing module for tuning an ET system is provided. The processing module may be arranged to determine a setting combination from a plurality of setting available to the ET system, and may include a configuration module and a search module. The search module may be arranged to determine a first setting in a plurality of first settings included in the plurality of settings, and the configuration module is arranged to configure the ET system by the first setting. After the ET system is configured by the first setting, the search module is further arranged to determine a second setting in a plurality of second settings included in the plurality of settings, and the configuration module is further arranged to configure the ET system by the second setting. In addition, the setting combination may include the first setting and the second setting.

One of the benefits of the present invention is that, a fine setting combination or an optimal setting combination from a plurality of settings available to an ET system may be determined efficiently by the method of the present invention, which greatly improves the performance of the ET system under the feasible ET tuning time.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

During the process of envelope tracking (ET) tuning, the performance indexes of multiple setting combinations may be measured to finally achieve better ET performance. For example, settings in one setting combination may include the ET algorithm setting, the ET tracker setting, and the power amplifier (PA) hardware (HW) setting, and the performance indexes may include error vector magnitude (EVM), adjacent channel leakage ratio (ACLR), receive-band noise (RXBN), and current. In addition, each of the ET algorithm setting, the ET tracker setting, and the PA HW setting may include a plurality of candidate settings. For example, the ET algorithm setting, the ET tracker setting, and the PA HW setting usually include 10 candidate settings, 512 candidate settings, and 512 candidate settings, respectively, and the number of setting combinations may be 2621440 (i.e. 10×512×512). It may approximately take 15 seconds for each measurement of the performance index of one setting combination, and it is time-consuming to check the full 2621440 setting combinations. As a result, the present invention provides a method for determining a setting combination from a plurality of settings available to an ET system that may greatly improve the performance of the ET system under the feasible ET tuning time.

Figure 1:
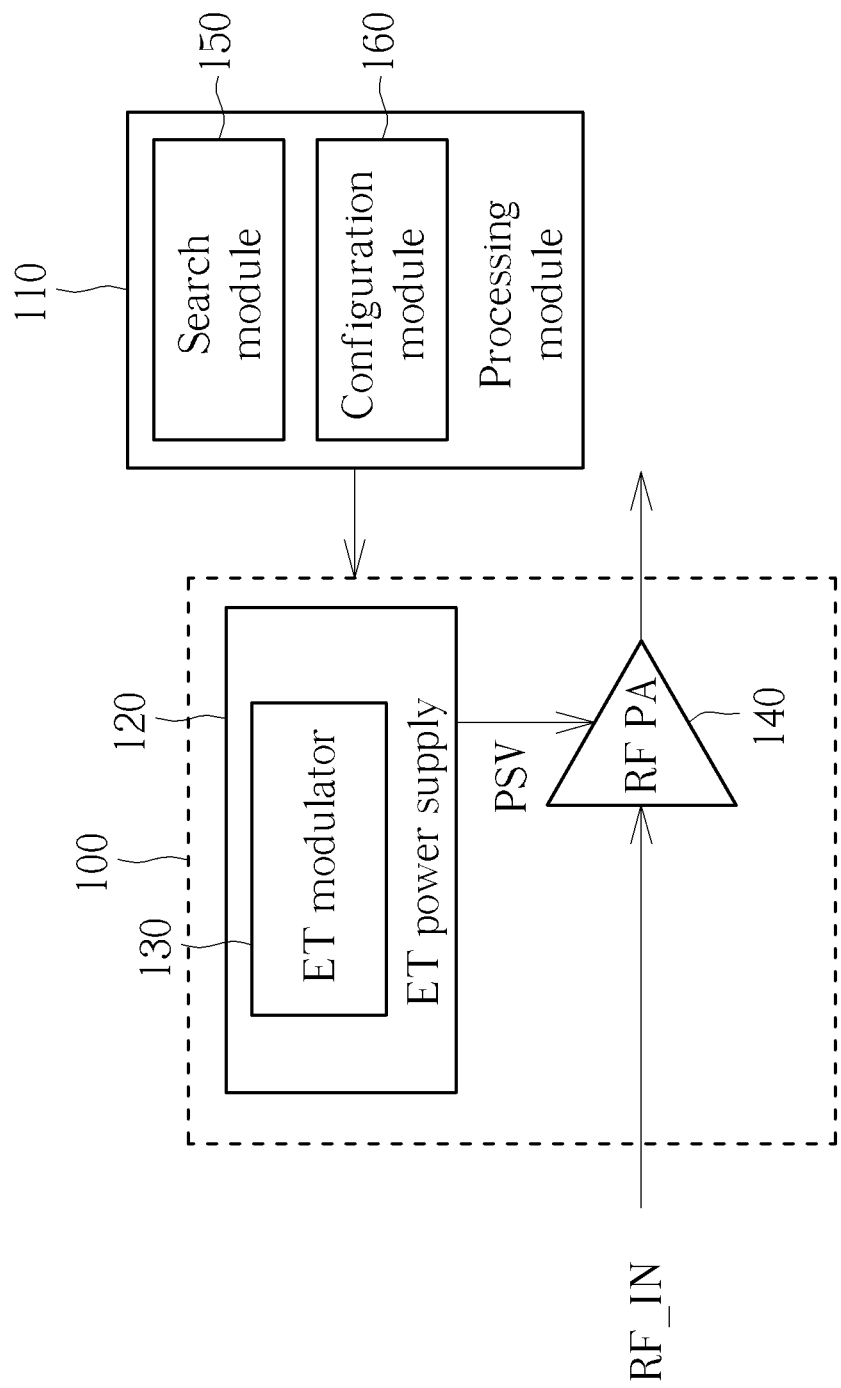
FIG. 1 is a diagram illustrating relationship between an envelope tracking (ET) system and a processing module according to an embodiment of the present invention.

FIG. 1 is a diagram illustrating relationship between an envelope tracking (ET) system 100 and a processing module 110 according to an embodiment of the present invention. As shown in FIG. 1, the ET system 100 may include an ET power supply 120 and a radio frequency (RF) power amplifier (PA) 140, wherein the ET power supply 120 may include an ET modulator 130, and the RF PA 140 may be arranged to receive an RF input signal RF_IN. The ET power supply 120 may be arranged to generate a PA power supply voltage PSV to the RF PA 140.

The processing module 110 may be arranged to determine a setting combination from a plurality of ET settings ET_SETTING available to the ET system 100, and may include a search module 150 and a configuration module 160, In some embodiments, the ET settings ET_SETTING may include a plurality of first settings FIRST_SETTING and a plurality of second settings SECOND_SETTING.

The search module 150 may be arranged to determine a first target setting FTS in the first settings FIRST_SETTING included in the ET settings ET_SETTING, and the configuration module 160 may be arranged to configure the ET system 100 by the first target setting FTS. After the ET system 100 is configured by the first target setting FTS, the search module 150 may be further arranged to determine a second target setting STS in the second settings SECOND_SETTING included in the ET settings ET_SETTING, and the configuration module 160 may be further arranged to configure the ET system 100 by the second target setting STS. The setting combination that is determined by the processing module 110 may include the first target setting FTS and the second target setting STS. It should be noted that, the first target setting FTS and the second target setting STS may be a fine setting (which means good enough) or even an optimal setting selected from the first settings FIRST_SETTING and a fine setting or even an optimal setting selected from the second settings SECOND_SETTING, respectively, and the setting combination may be a fine setting combination (or an optimal setting combination), but the present invention is not limited thereto.

For example, each of the first settings FIRST_SETTING may be a combination of one setting selected from a plurality of first-type settings and another setting selected from a plurality of second-type settings. Each of the first-type settings may be one of an ET algorithm setting, an ET tracker setting, and a PA hardware (HW) setting, and each of the second-type settings may be another of the ET algorithm setting, the ET tracker setting, and the PA HW setting, wherein the ET algorithm setting may be involved in the conversion between an in-phase and quadrature (IQ) signal and an envelope signal (not shown in FIG. 1), the ET tracker setting may be involved in operations of the ET modulator 130, and the PA HW setting may be involved in operations of the RF PA 140. Each of the second settings SECOND_SETTING may be yet another of the ET algorithm setting, the ET tracker setting, and the PA HW setting.

For another example, each of the second settings SECOND_SETTING may be a combination of one setting selected from the plurality of first-type settings and another setting selected from the plurality of second-type settings, wherein each of the first-type settings may be one of the ET algorithm setting, the ET tracker setting, and the PA HW setting, and each of the second-type settings may be another of the ET algorithm setting, the ET tracker setting, and the PA HW setting. The first settings FIRST_SETTING may be yet another of the ET algorithm setting, the ET tracker setting, and the PA HW setting.

In some embodiments, the ET settings ET_SETTING may further include a plurality of third settings THIRD_SETTING (i.e. the ET settings ET_SETTING may include the first settings FIRST_SETTING, the second settings SECOND_SETTING, and the third settings THIRD_SETTING). None of the first settings FIRST_SETTING, the second settings SECOND_SETTING, and the third settings THIRD_SETTING is a setting combination. For example, each of the first settings FIRST_SETTING may be one of the ET algorithm setting, the ET tracker setting, and the PA HW setting; each of the second settings SECOND_SETTING may be another of the ET algorithm setting, the ET tracker setting, and the PA HW setting; and each of the third settings THIRD_SETTING may be yet another of the ET algorithm setting, the ET tracker setting, and the PA HW setting. In addition, after the ET system 100 is configured by the second target setting STS, the search module 150 may be further arranged to determine a third target setting TTS in the third settings THIRD_SETTING included in the ET settings ET_SETTING, and the configuration module 160 may be further arranged to configure the ET system 100 by the third target setting TTS. It should be noted that, the third target setting TTS may be a fine setting or even an optimal setting selected from the third settings THIRD_SETTING, but the present invention is not limited thereto.

In the process of determining the first target setting FTS in the first settings FIRST_SETTING included in the ET settings ET_SETTING, regarding each first setting of the first settings FIRST_SETTING, the configuration module 160 may be arranged to configure the ET system 100 by the first setting under test, and the search module 150 may be arranged to measure at least one performance index of the ET system 100 configured by the first setting under test, to generate a measurement result, wherein the at least one performance index of the ET system 100 may include error vector magnitude (EVM)), adjacent channel leakage ratio (ACLR), receive-band noise (RXBN), and/or current. Afterwards, the search module 150 may be arranged to determine the first target setting FTS according to a plurality of measurement results that are measured for the first settings FIRST_SETTING, respectively.

Similarly, in the process of determining the second target setting STS in the second settings SECOND_SETTING included in the ET settings ET_SETTING, regarding each second setting of the second settings SECOND_SETTING, the configuration module 160 may be arranged to configure the ET system 100 by the second setting under test, and the search module 150 may be arranged to measure at least one performance index of the ET system 100 configured by the second setting under test, to generate a measurement result. Afterwards, the search module 150 may be arranged to determine the second target setting STS according to a plurality of measurement results that are measured for the second settings SECOND_SETTING, respectively. For brevity, similar descriptions for the process of determining the third target setting TTS in the third settings THIRD_SETTING included in the ET settings ET_SETTING are not repeated in detail here.

For better ET system performance, an iteration value I may be set by the processing module 110, wherein a maximum value of the iteration value I may be 1 or 2 according to design requirements. In the beginning, the iteration value I is set as 0 by the processing module 110. After one setting combination (e.g. one setting combination of an optimal ET algorithm setting, an optimal ET tracker setting, and an optimal PA HW setting) is determined from the ET settings ET_SETTING available to the ET system 100, the processing module 110 may be arranged to add 1 to the iteration value I. When the iteration value I is not the maximum value yet, the process of determining the setting combination from the ET settings ET_SETTING available to the ET system 100 may be performed again by the processing module 110.

Figure 2:
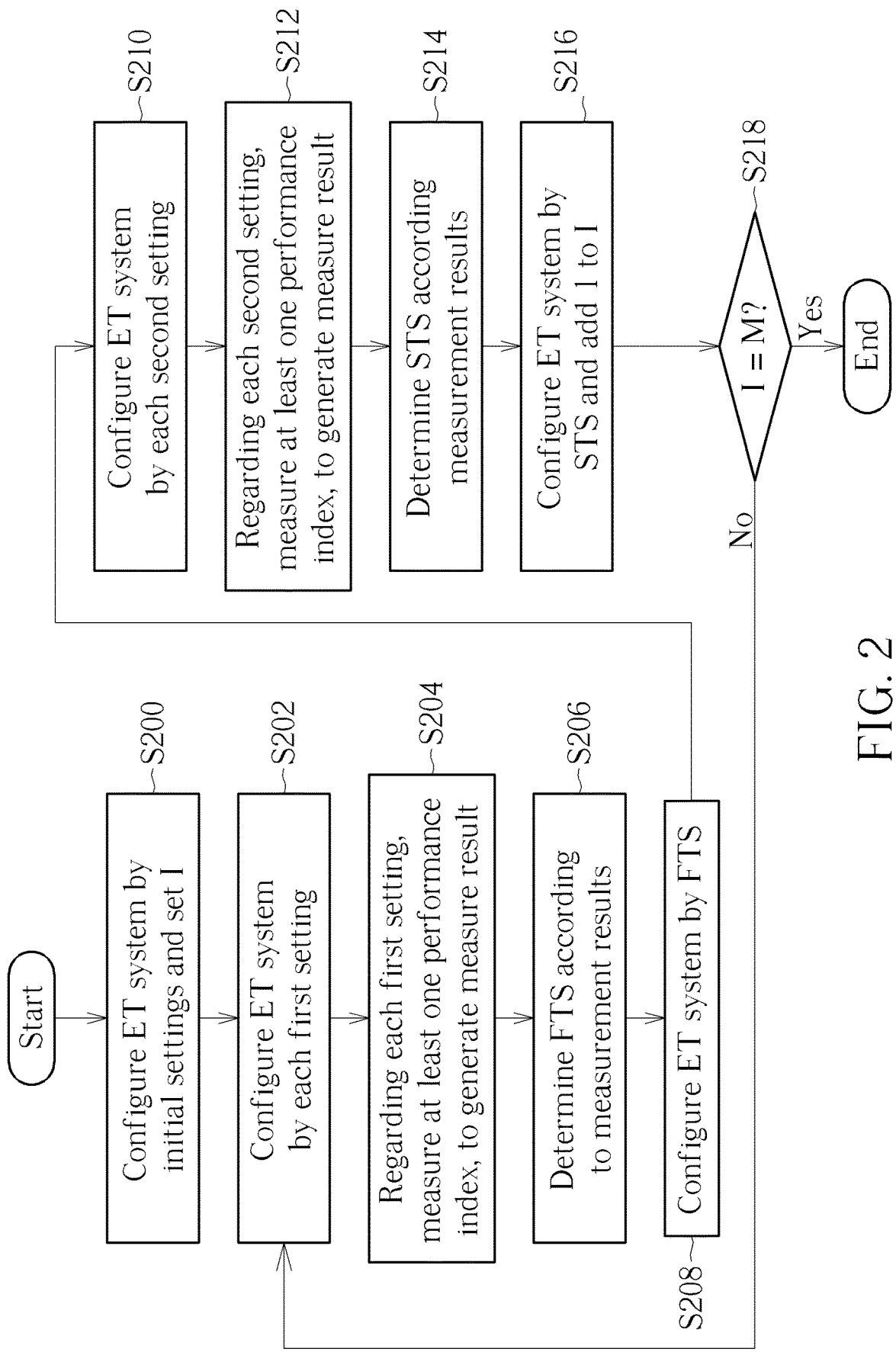
FIG. 2 is a flow chart of a method for determining a setting combination from a plurality of ET settings that are available to an ET system according to an embodiment of the present invention.

FIG. 2 is a flow chart of a method for determining a setting combination from a plurality of ET settings that are available to an ET system according to an embodiment of the present invention. Provided that the result is substantially the same, the steps are not required to be executed in the exact order shown in FIG. 2. For example, the method shown in FIG. 2 may be employed by the ET system 100 and the processing module 110 shown in FIG. 1.

In this embodiment, the ET settings ET_SETTING available to the ET system 100 include the first settings FIRST_SETTING and the second settings SECOND_SETTING, wherein each of the first settings FIRST_SETTING is a combination of one setting selected from a plurality of ET algorithm settings and another setting selected from a plurality of ET tracker settings, and each of the second settings SECOND_SETTING is a setting selected from a plurality of PA HW settings. It is assumed that the number of candidate settings of the plurality of ET algorithm settings is a, the number of candidate settings of the plurality of ET tracker settings is b, and the number of candidate settings of the plurality of PA HW settings is c. As a result, the number of the first settings FIRST_SETTING is a×b. In addition, the setting combination that is determined by the processing module 110 includes the first target setting FTS and the second target setting STS, wherein the first target setting FTS and the second target setting STS are an optimal setting selected from the first settings FIRST_SETTING and an optimal setting selected from the second settings SECOND_SETTING, respectively, and the setting combination is an optimal setting combination for the ET system 100. It should be noted that, the order of determining the first target setting FTS from the first settings FIRST_SETTING and determining the second target setting STS from the second settings SECOND_SETTING may be adjusted, depending upon actual design considerations.

In Step S200, the ET system 100 is configured by initial settings of the ET algorithm, the ET tracker, and the PA HW through the configuration module 160 of the processing module 110. In addition, the iteration value I is set by the processing module 110 (e.g. the iteration value I is set as 0, and the maximum value of the iteration value I is set as 1 or 2 according to design requirements).

In Step S202, regarding each first setting of the first settings FIRST_SETTING, the ET system 100 is configured by the first setting through the configuration module 160.

In Step S204, regarding each first setting of the first settings FIRST_SETTING, at least one performance index (e.g. the current) of the ET system 100 configured by the first setting is measured by the search module 150, to generate a measure result.

In Step S206, the first target setting FTS (i.e. the optimal setting selected from the first settings FIRST_SETTING) is determined by the search module 150 according to a plurality of measurement results that are measured for the first settings FIRST_SETTING, respectively.

In Step S208, the ET system 100 is configured by the first target setting FTS through the configuration module 160.

In Step S210, after the ET system 100 is configured by the first target setting FTS through the configuration module 160, regarding each second setting of the second settings SECOND_SETTING, the ET system 100 is configured by the second setting through the configuration module 160.

In Step S212, regarding each second setting of the second settings SECOND_SETTING, at least one performance index of the ET system 100 configured by the second setting is measured by the search module 150, to generate a measure result.

In Step S214, the second target setting STS is determined by the search module 150 according to a plurality of measurement results that are measured for the second settings SECOND_SETTING, respectively.

In Step S216, the ET system 100 is configured by the second target setting STS by the configuration module 160. In addition, 1 is added to the iteration value I by the processing module 110, that is, I=I+1.

In Step S218, it is determined whether the iteration value I is the maximum value (for brevity, labeled as "M" in FIG. 2). If Yes, the flow ends; if No, Step S202 is returned.

For determining the setting combination by the method shown in FIG. 2, the number of measurements during the method shown in FIG. 2 is (a×b)+c (which includes the measurements of at least one performance index of the ET system 100 configured by each first setting in Step S204 and the measurements of at least one performance index of the ET system 100 configured by each second setting in Step S212), and the ET tuning time may become feasible.

Considering a case where the ET settings ET_SETTING available to the ET system 100 is modified to only include a plurality of settings each being a combination of one setting selected from the plurality of ET algorithm settings, another setting selected from the plurality of ET tracker settings, and the other setting selected from the plurality of PA HW setting. In this case, the number of measurements is a×b×c, and the ET tuning time may not be feasible. To address this issue, the number of each setting in the combination is directly reduced at the expense of the performance of the ET system 100 (e.g. the current that is saved by the ET system 100 may be reduced). Compared with this case, the ET system 100 with the ET settings that include the first settings FIRST_SETTING and the second settings SECOND_SETTING may save more current, which greatly improves the performance of the ET system 100 under feasible ET tuning time.

Since a person skilled in the pertinent art can readily understand details of the steps after reading above paragraphs directed to the ET system 100 and the processing module 110 shown in FIG. 1, further description is omitted here for brevity.

Figure 3:
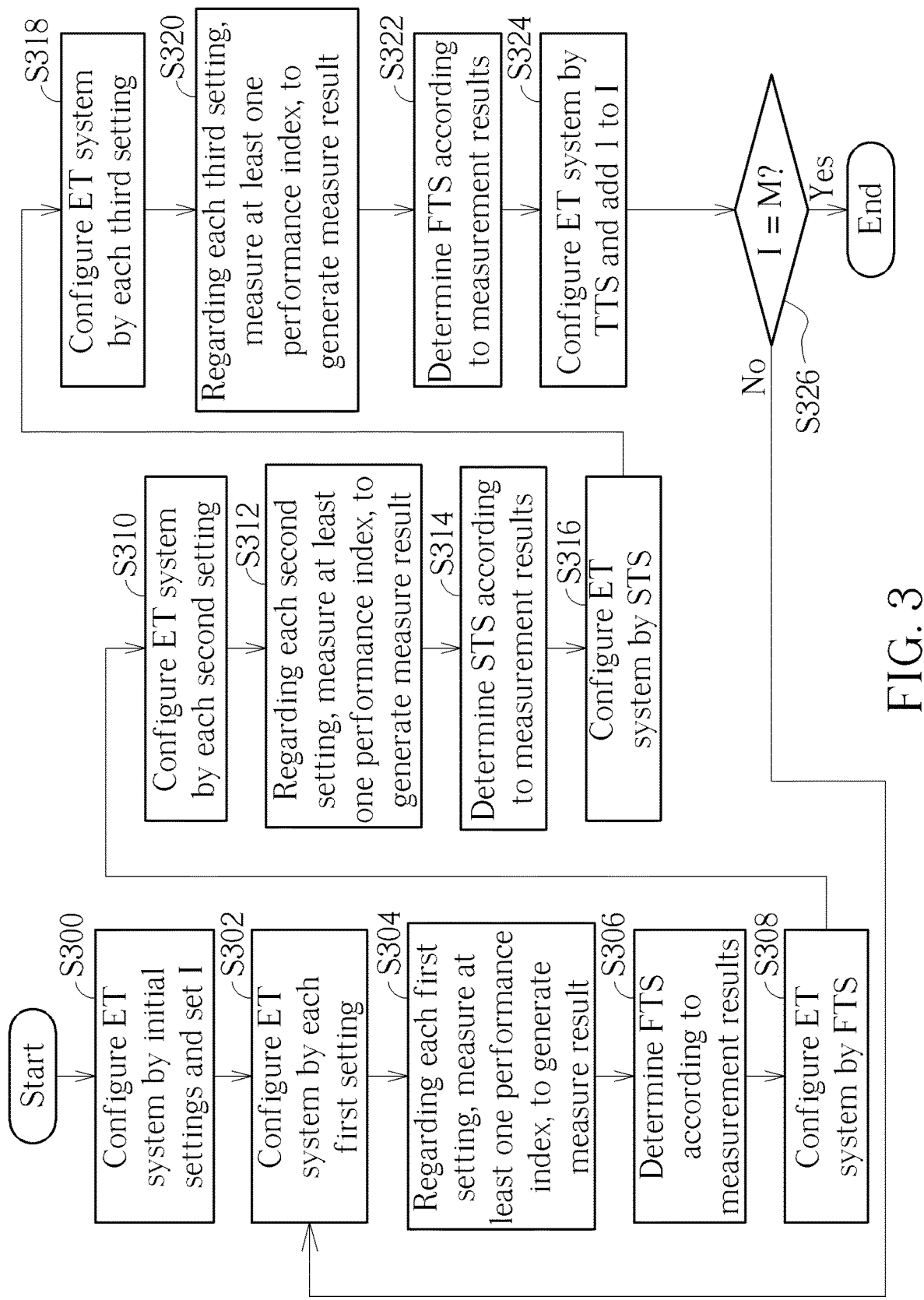
FIG. 3 is a flow chart of a method for determining a setting combination from a plurality of ET settings that are available to an ET system according to another embodiment of the present invention.

FIG. 3 is a flow chart of a method for determining a setting combination from a plurality of ET settings that are available to an ET system according to another embodiment of the present invention. Provided that the result is substantially the same, the steps are not required to be executed in the exact order shown in FIG. 3. For example, the method shown in FIG. 3 may be employed by the ET system 100 and the processing module 110 shown in FIG. 1.

In this embodiment, the ET settings ET_SETTING available to the ET system 100 include the first settings FIRST_SETTING, the second settings SECOND_SETTING, and the third settings THIRD_SETTING, wherein each of the first settings FIRST_SETTING is an ET algorithm setting selected from the plurality of ET algorithm settings, each of the second settings SECOND_SETTING is an ET tracker setting selected from the plurality of ET tracker settings, and the third settings THIRD_SETTING is a PA HW setting selected from the plurality of PA HW settings. It is assumed that the number of candidate settings of the plurality of ET algorithm settings is a, the number of candidate settings of the plurality of ET tracker settings is b, and the number of candidate settings of the plurality of PA HW settings is c. In addition, the setting combination that is determinedly the processing module 110 includes the first target setting FTS, the second target setting STS, and the third target setting TTS, wherein the first target setting FTS, the second target setting STS, and the third target setting TTS are an optimal setting selected from the first settings FIRST_SETTING, an optimal setting selected from the second settings SECOND_SETTING, and an optimal setting selected from the third settings THIRD_SETTING, respectively, and the setting combination is an optimal setting combination for the ET system 100. It should be noted that, the order of determining the first target setting FTS from the first settings FIRST_SETTING, determining the second target setting STS from the second settings SECOND_SETTING, and determining the third target setting TTS from the third settings THIRD_SETTING may be adjusted, depending upon actual design considerations.

In Step S300, the ET system 100 is configured by initial settings of the ET algorithm, the ET tracker, and the PA HW through the configuration module 160 of the processing module 110. In addition, the iteration value I is set by the processing module 110 (e.g. the iteration value I is set as 0, and the maximum value of the iteration value I is set as 1 or 2 according to design requirements).

In Step S302, regarding each first setting of the first settings FIRST_SETTING, the ET system 100 is configured by the first setting through the configuration module 160.

In Step S304, regarding each first setting of the first settings FIRST_SETTING, at least one performance index (e.g. the current) of the ET system 100 configured by the first setting is measured by the search module 150, to generate a measure result.

In Step S306, the first target setting FTS (i.e. the optimal setting selected from the first settings FIRST_SETTING) is determined by the search module 150 according to a plurality of measurement results that are measured for the first settings FIRST_SETTING, respectively.

In Step S308, the ET system 100 is configured by the first target setting FTS through the configuration module 160.

In Step S310, after the ET system 100 is configured by the first target setting FTS through the configuration module 160, regarding each second setting of the second settings SECOND_SETTING, the ET system 100 is configured by the second setting through the configuration module 160.

In Step S312, regarding each second setting of the second settings SECOND_SETTING, at least one performance index of the ET system 100 configured by the second setting is measured by the search module 150, to generate a measure result.

In Step S314, the second target setting STS (i.e. the optimal setting selected from the second settings SECOND_SETTING) is determined by the search module 150 according to a plurality of measurement results that are measured for the second settings SECOND_SETTING, respectively.

In Step S316, the ET system 100 is configured by the second target setting STS by the configuration module 160.

In Step S318, after the ET system 100 is configured by the second target setting STS through the configuration module 160, regarding each third setting of the third settings THIRD_SETTING, the ET system 100 is configured by the third setting through the configuration module 160.

In Step S320, regarding each third setting of the third settings THIRD_SETTING, at least one performance index of the ET system 100 configured by the third setting is measured by the search module 150, to generate a measure result.

In Step S322, the third target setting TTS (i.e. the optimal setting selected from the third settings THIRD_SETTING) is determined by the search module 150 according to a plurality of measurement results that are measured for the third settings THIRD_SETTING, respectively.

In Step S324, the ET system 100 is configured by the third target setting TTS by the configuration module 160. In addition, 1 is added to the iteration value I by the processing module 110.

In Step S326, it is determined whether the iteration value I is the maximum value (for brevity, labeled as "M" in FIG. 3). If Yes, the flow ends; if No, Step S302 is returned.

For determining the setting combination by the method shown in FIG. 3, the number of measurements during the method shown in FIG. 3 is a+b+c (which includes the measurements of at least one performance index of the ET system 100 configured by each first setting in Step S304, the measurements of at least one performance index of the ET system 100 configured by each second setting in Step S312, and the measurements of at least one performance index of the ET system 100 configured by each third setting in Step S320), and the ET tuning time may become feasible.

Considering a case where the ET settings ET_SETTING available to the ET system 100 is modified to only include a plurality of settings each being a combination of one setting selected from the plurality of ET algorithm settings, another setting selected from the plurality of ET tracker settings, and the other setting selected from the plurality of PA HW setting. In this case, the number of measurements is a×b×c, and the ET tuning time may not be feasible. To address this issue, the number of each setting in the combination is directly reduced at the expense of the performance of the ET system 100 (e.g. the current that is saved by the ET system 100 may be reduced). Compared with this case, the ET system 100 with the ET settings that include the first settings FIRST_SETTING, the second settings SECOND_SETTING, and the third settings THIRD_SETTING may save more current, which greatly improves the performance of the ET system 100 under feasible ET tuning time.

Since a person skilled in the pertinent art can readily understand details of the steps after reading above paragraphs directed to the ET system 100 and the processing module 110 shown in FIG. 1, further description is omitted here for brevity.

Figure 4:
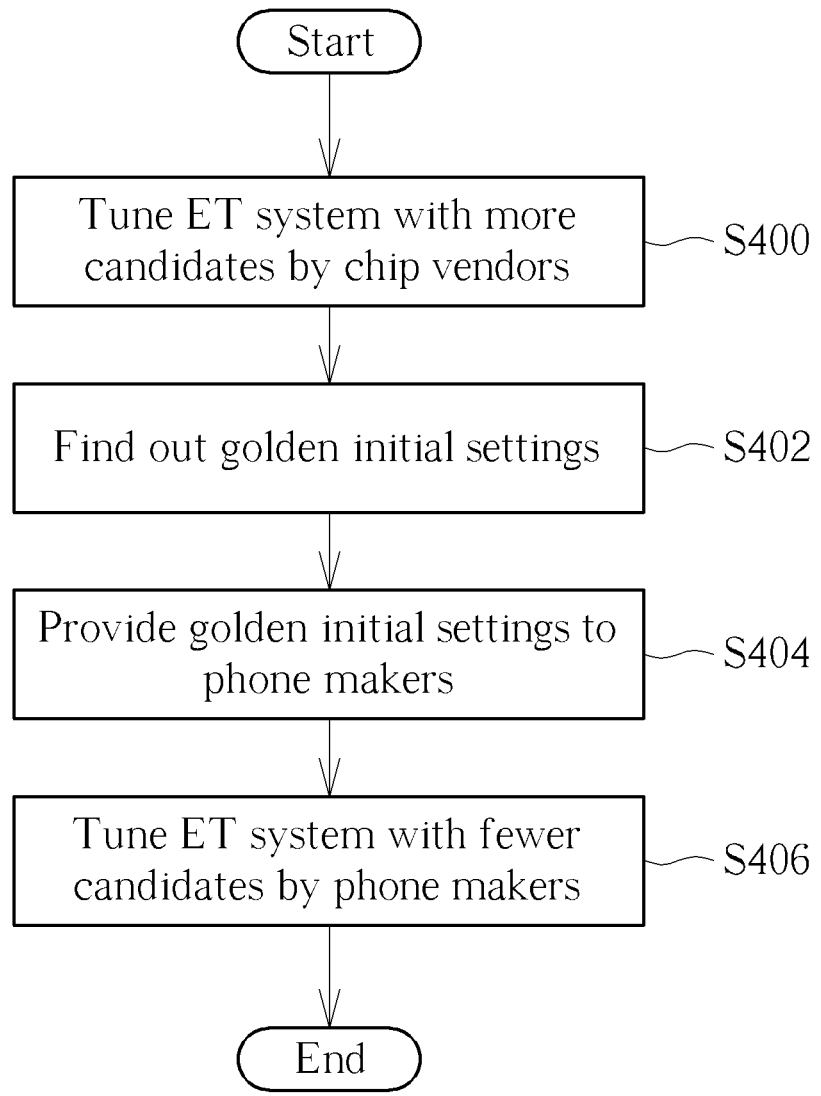
FIG. 4 is a flow chart of a method for more efficient ET tuning of an ET system between chip venders and phone makers according to an embodiment of the present invention.

In addition, since the same models of the ET tracker and the RF PA may be applied at different models of a wireless communication device (e.g. a phone), there is no need to do the full ET tuning for each of models of the phone. FIG. 4 is a flow chart of a method for more efficient ET tuning of an ET system between chip venders and phone makers according to an embodiment of the present invention, wherein the chip venders may provide chips that are disposed in phones made by the phone makers. Provided that the result is substantially the same, the steps are not required to be executed in the exact order shown in FIG. 4. For example, the method shown in FIG. 4 may be employed by the method shown in FIG. 2 or FIG. 3 with the chip venders and the phone makers.

In Step S400, the chip venders may utilize the method shown in FIG. 2 or FIG. 3 to determine a setting combination (e.g. an optimal setting combination) from the plurality of ET settings that are available to the ET system, and tune the ET system with the setting combination, wherein in the process of determining the setting combination, the number of candidate settings of the plurality of ET algorithm settings is a, the number of the plurality of candidate settings of ET tracker settings is b, and the number of candidate settings of the plurality of PA HW settings is c.

In Step S402, golden initial settings are found out after the ET system is tuned with the setting combination by the chip venders.

In Step S404, the golden initial settings are provided to the phone makers by the chip vendors.

In Step 406, the phone makers may utilize the golden initial settings and the method shown in FIG. 2 or FIG. 3 to determine a setting combination from the plurality of ET settings that are available to the ET system, and tune the ET system with the setting combination. For example, in Step S200 (or Step S300), the ET system 100 is configured by the golden initial settings of the ET algorithm, the ET tracker, and the PA HW through the configuration module 160 of the processing module 110. In addition, in the process of determining the setting combination, the number of candidate settings of the plurality of ET algorithm settings is a' (which is smaller than a), the number of candidate settings of the plurality of ET tracker settings is b' (which is smaller than b), and the number of candidate settings of the plurality of PA HW settings is c' (which is smaller than c). As a result, the phone makers may tune the ET system more efficiently with fewer candidates according to the method shown in FIG. 4.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for tuning an envelope tracking (ET) system, comprising:
    determining a setting combination from a plurality of setting available to the ET system, wherein determining the setting combination from the plurality of setting available to the ET system comprises:
        determining, by a processing module, a first setting in a plurality of first settings included in the plurality of settings, and configuring the ET system by the first setting; and
        after the ET system is configured by the first setting, determining, by the processing module, a second setting in a plurality of second settings included in the plurality of settings, and configuring the ET system by the second setting;
    wherein the setting combination comprises the first setting and the second setting;
    wherein determining the first setting in the plurality of first settings included in the plurality of settings comprises:
        regarding each first setting of the plurality of first settings, measuring at least one performance index of the ET system configured by said each first setting, to generate a measurement result; and
        determining the first setting according to a plurality of measurement results that are measured for the plurality of first settings, respectively.

2. The method of claim 1, wherein each of the plurality of first settings is one of an ET algorithm setting, an ET tracker setting and a power amplifier (PA) hardware settings.

3. The method of claim 1, wherein each of the plurality of second settings is one of an ET algorithm setting, an ET tracker setting and a power amplifier (PA) hardware settings.

4. The method of claim 1, further comprising:
    after the ET system is configured by the second setting, determining, by the processing module, a third setting in a plurality of third settings included in the plurality of settings, and configuring the ET system by the third setting;
    wherein the setting combination further comprises the third setting.

5. The method of claim 4, wherein each of the plurality of first settings is one of an ET algorithm setting, an ET tracker setting and a power amplifier (PA) hardware settings; each of the plurality of second settings is another of the ET algorithm setting, the ET tracker setting and the PA hardware settings; and each of the plurality of third settings is yet another of the ET algorithm setting, the ET tracker setting and the PA hardware settings.

6. The method of claim 4, wherein determining the third setting in the plurality of third settings included in the plurality of settings comprises:
    regarding each third setting of the plurality of third settings, measuring at least one performance index of the ET system configured by said each third setting, to generate a measurement result; and
    determining the third setting according to a plurality of measurement results that are measured for the plurality of third settings, respectively.

7. A method for tuning an envelope tracking (ET) system, comprising:
    determining a setting combination from a plurality of setting available to the ET system, wherein determining the setting combination from the plurality of setting available to the ET system comprises:
        determining, by a processing module, a first setting in a plurality of first settings included in the plurality of settings, and configuring the ET system by the first setting; and
        after the ET system is configured by the first setting, determining, by the processing module, a second setting in a plurality of second settings included in the plurality of settings, and configuring the ET system by the second setting;
    wherein the setting combination comprises the first setting and the second setting; and
    wherein each of the plurality of first settings is a combination of one setting selected from a plurality of first-type settings and another setting selected from a plurality of second-type settings; each of the first-type settings is one of an ET algorithm setting, an ET tracker setting and a power amplifier (PA) hardware setting; and each of the second-type settings is another of the ET algorithm setting, the ET tracker setting and the PA hardware setting.

8. The method of claim 7, wherein each of the plurality of second settings is yet another of the ET algorithm setting, the ET tracker setting and the PA hardware setting.

9. A method for tuning an envelope tracking (ET) system, comprising:
    determining a setting combination from a plurality of setting available to the ET system, wherein determining the setting combination from the plurality of setting available to the ET system comprises:
        determining, by a processing module, a first setting in a plurality of first settings included in the plurality of settings, and configuring the ET system by the first setting; and
        after the ET system is configured by the first setting, determining, by the processing module, a second setting in a plurality of second settings included in the plurality of settings, and configuring the ET system by the second setting;

wherein the setting combination comprises the first setting and the second setting; and wherein each of the plurality of second settings is a combination of one setting selected from a plurality of first-type settings and another setting selected from a plurality of second-type settings; each of the first-type settings is one of an ET algorithm setting, an ET tracker setting and a power amplifier (PA) hardware setting; and each of the second-type settings is another of the ET algorithm setting, the ET tracker setting and the PA hardware setting.

10. The method of claim 9, wherein each of the plurality of first settings is yet another of the ET algorithm setting, the ET tracker setting and the PA hardware setting.

11. A method for tuning an envelope tracking (ET) system, comprising:

determining a setting combination from a plurality of setting available to the ET system, wherein determining the setting combination from the plurality of setting available to the ET system comprises:

determining, by a processing module, a first setting in a plurality of first settings included in the plurality of settings, and configuring the ET system by the first setting; and after the ET system is configured by the first setting, determining, by the processing module, a second setting in a plurality of second settings included in the plurality of settings, and configuring the ET system by the second setting;

wherein the setting combination comprises the first setting and the second setting; and wherein determining the second setting in the plurality of second settings included in the plurality of settings comprises:

regarding each second setting of the plurality of second settings, measuring at least one performance index of the ET system configured by said each second setting, to generate a measurement result; and determining the second setting according to a plurality of measurement results that are measured for the plurality of second settings, respectively.

* * * * *